(12) United States Patent
Bohn et al.

(10) Patent No.: US 6,237,217 B1
(45) Date of Patent: May 29, 2001

(54) APPARATUS AND METHOD FOR PROCESSING A WEB, MORE PARTICULARLY A TRANSPONDER STRIP

(75) Inventors: Martin Bohn, Reutlingen; Wolfgang Scheller, Oberpleichfeld, both of (DE)

(73) Assignee: bielomatik Leuze GmbH & Co., Neuffen (DE)

( * ) Notice: Subject to any disclaimer, the term of this patent is extended or adjusted under 35 U.S.C. 154(b) by 0 days.

(21) Appl. No.: 09/425,635

(22) Filed: Oct. 22, 1999

(30) Foreign Application Priority Data

Oct. 22, 1998 (DE) .............................................. 198 48 716

(51) Int. Cl.$^7$ ..................................................... B23P 19/00
(52) U.S. Cl. ................................. 29/806; 83/105; 83/106; 83/102; 83/150; 156/502; 156/510; 156/512; 156/159; 228/51
(58) Field of Search ........................ 29/806, 514; 156/64, 156/502, 159, 512, 510; 83/105, 106, 150, 102; 228/51

(56) References Cited

U.S. PATENT DOCUMENTS

| | | | |
|---|---|---|---|
| 3,562,045 | * | 2/1971 | Hasegawa . |
| 3,687,787 | * | 8/1972 | Grand, III . |
| 3,854,357 | * | 12/1974 | Kron ........................................ 83/105 |
| 4,566,922 | * | 1/1986 | Martinez ................................ 156/64 |
| 5,284,043 | * | 2/1994 | Hayashi .................................. 72/330 |

FOREIGN PATENT DOCUMENTS

| | | |
|---|---|---|
| 30 15 169 | 10/1981 | (DE) . |
| 32 38 536 | 5/1983 | (DE) . |
| 197 23 847 | 5/1998 | (DE) . |

* cited by examiner

*Primary Examiner*—P. W. Echols
*Assistant Examiner*—John C. Hong
(74) *Attorney, Agent, or Firm*—Akerman Senterfitt (57) ABSTRACT

For removing defective transponder units or electronic transponder equipment a web (6) is parted in a station (23) firstly in front and then at the rear of the individual unit. Thereafter the picked out unit is conveyed off transverse to a working plane (3) and the two resulting web ends are transferred into a directly juxtaposed station (24). There the web ends are fixedly interconnected by welding, glueing or the like. Therefrom a use web arises, which includes only non-defective units since the defective units were previously detected by a sensor (32) and then severed out as described with the aid of a control device (50). This fully automatically working apparatus (1) coils the processed use tape in a store (26) into a roll (40) which is suitable for further processing in a machine.

28 Claims, 4 Drawing Sheets

APPARATUS AND METHOD FOR PROCESSING A WEB, MORE PARTICULARLY A TRANSPONDER STRIP

TECHNICAL FIELD AND BACKGROUND OF THE INVENTION

Strip-type webs may comprise lengthwise in panel positions a plurality of panel fields which have the same or differing linear extensions and are stringed together in one part. The strip is e.g. a support strip of plastics material, such as polyester, paper or the like of constant thickness and extends in one part full-length over all panel fields. In each panel field the support web is provided only on part of the aeral field extension with a protruding layer or coating on one side only, or on both sides. The layer is constant in thickness and/or the layer is a protruding function/control member. The thickness of the translucent to transparent support web is less than a tenth or five hundredths of a millimeter. Compared thereto the thickness of the layer is smaller and that of the function member is greater.

The support film or foil is electrically insulating. The layer is electrically conducting and made of a metal such as copper or aluminum. The function member is an electronic memory chip having a side length of less than 10 mm or 5 mm. The terminals of this member are electrically conductively connected to separate counter contacts of the layer. The layer constitutes for the silicon chip or integrated circuit an antenna which receives and/or transmits RF signals. The signals are utilized by the electric circuit of the unit as small electric currents for contactless reading or writing digitized data from or into the electronic memory. The transponder unit can be without an electric battery or capacitor or it may comprise such function units in a lowprofile arrangement in the scope of the cited thickness. Transponder units find application in the field of electronic item security, origin marking and the like. The transponder units are suitable as a coating component or intermediate layer in other marking or authorization items such as air travel tickets, baggage tags, security documents, package labels, chip cards or the like. The coating is deposited by evaporating. The circuit configuration is etched photochemically or printed. Thereafter the memory or Silicon chip is fixed so that its terminals are connected to the antenna connectors.

Such a web may repeatedly include unwanted panel fields or second sections, namely defective transponder units which are not readable or writeable upon and thus are unsuitable for further processing. Thus there is a need to exclude such sections or defects from the panel position within the web before the web or panel fields are incorporated in a laminate, such as sticker material, or in substrates such as paper or plastics laminates to produce the finished product. The latter is then a rolled up or zig-zag piled web, such as a label web, a sticker web or a paper laminate. The finished product may also be single sheets each including at least one transponder unit or the like. It is conceivable to detect the unwanted sections not before the product is finished and to reject them. Preferably these sections are withdrawn prior to being incorporated in the finished product, namely rejected from the web so that it contains only the desired first sections as panel fields with no unwanted sections. Such a "cleaned" web may then be processed by machining or fully automatically for producing the finished product without containing these unwanted sections.

OBJECTS OF THE INVENTION

An object of the invention is to provide an apparatus or a method with which a web may be altered so that sections of a second quality contained in its field pattern can be replaced by field sections of a first quality. Another object is to permit elimination of defective transponder units from the field pattern so that a use web or a strip results which contains substantially fewer defective units in the array pattern than before, or exclusively non-defective units. Still a further object is to permit that the apparatus is operated at high speed or semi- or fully automatically. Another object is to provide simple design and easy operability of the apparatus. Still another object is to facilitate checking satisfactory operation.

SUMMARY OF THE INVENTION

According to the invention the apparatus comprises an apparatus base or a stationary base frame with a removal station which has means or tools for eliminating the second sections from the field arrangement or for stringing first sections together at a close spacing where before a larger spacing existed. The web section could be transferred from the field pattern into a plane directly adjoining the web by a double Z-fold and could then be totally covered by the string of field sections or remain compounded in the web. Otherwise the section does not remain compounded in the web, but is totally disconnected from the web with or without previous folding. This results in severed edges opposing each other in the web or support layer. The edges are perpendicular to the length extension of the web. The edges are fixedly interconnected by an overlap seam or a butt seam to reassume a continuous web. This use web then contains exclusively the wanted first sections and is shorter by the eliminated portions.

After eliminating each second section, direct mutual splicing of those field sections is done which previously adjoined the second section on both sides. This is done in a splicing station by welding, bonding or the like. The splice may be made with or without addition of a material, for example adhesive tape. The jointing point is spaced from the severing point as least possible. Thus all web parts before and after severing always need to be moved only in one and the same direction and over minimum distances for stringing together. Upstream and downstream of these two points as well as before and after severing, the web is permanently positionally secured or moved parallel to its web plane and to its length direction only by clamping or by positive engagement in a lengthwise perforation. The same web conveyor may serve for both the feed motion of the unsevered web and also of the web ends while approaching each other or the like.

A detector detects the web fields to be extracted while the web moves or traverses the stations. The detector conducts an appropriate signal to control means which track the arrival of the web section in the removal station and which conduct control signals to powered drives of this station for extracting and stringing. Such drives are separate for the severing tools, the splicing tools and each of the web conveyors on both sides of the severing or splicing point and thus are controllable independently of each other. The control means coordinate all of these drives fully automatically. Thus, e.g. in sequence the web transport is halted on arrival of the leading severing zone of the web section in the severing plane. Then a first severing is done. Then both parted web ends are advanced commonly or one after the other until the trailing parting zone arrives in the severing plane. Then the second severing is done. Then the thus freed web section is rejected from the web plane. Then the upstream web end is approached to the stationary other or downstream web end to abut or overlap. Then the upstream web end is relocked. Then splicing of the stationarily adjoined web ends is done in the jointing plane. In conclusion both stringed web ends are advanced commonly until on arrival of the next unwanted section this working cycle is repeated. The sensor for registering the web sections is on the upstream side directly juxtaposed with the working plane of the removal station or with the associated clamping or engaging plane of the conveyor. Another such sensor may also be provided downstream thereof for rechecking after stringing of the web sections.

Particularly when the web is processed with a non-horizontal or with a vertical longitudinal center plane the web is laterally aligned directly before entering the cited stations and/or after exiting therefrom. Aligning is done precisely and dynamically relative to the base. For this purpose a web deflection executes aligning motions transverse to its length direction and parallel to the web plane or parallel to its deflecting axis. These motions are controlled by a sensor which records the alignment state of the web. When the longitudinal center plane of the web is not vertical, for example horizontal, the force of the web weight may be sufficient for slidingly aligning the web on an edge guiding face beneath the web.

The cited stations are arranged between two web stores. Each is drivable independently of the other. Thus the web is unwound from one store, then guided through processing as cited before and then wound up on the other store or piled zig-zag. Downstream of the supply store or upstream of the take up store a buffer store is arranged to supply or take up web lengths depending on the web tension but irrespective of the adjacent powered store. The cited stations are provided in a preassembled unit to be secured as a whole and irrespective of the stores or of the web edge control and buffer stores to the apparatus base for non-destructive removal therefrom. The base has only one main side cheek. On the cheeks front side the processing stations, the stores and the associated guides are freely exposed, where necessary with freely projecting shafts. Thus the web can be inserted in or taken out from the apparatus on both sides of the processing station or over its full travel length parallel to its associated deflecting axes.

For controlling the web, its ends and its web sections, particularly for fixing them to and releasing them from the tools a fluid control is provided. This control has vacuum or blower ports for sucking or repelling the cited web sections. Thus it is easier to prevent the severed sections from being entrained in the web motion instead of being moved away from the web with increasingly greater distance.

The method according to the invention consequently includes that the unwanted section or defect is eliminated or moved away from its field arrangement, whereafter the previously adjoining field sections are fixedly or non-releasably interconnected in flush alignment with a shortening of the web. Before that the web is sensed on the fly so that the web section can be indicated in due time prior to attaining the processing station and can be correspondingly marked.

For a minimum web width of 30 mm or 48 mm and a maximum width of 200 mm or 160 mm web rolls of at least 150 mm or 200 mm or maximum 700 mm or 500 mm diameter are produced in accordance with the invention. The apparatus could also be manually drivable, for example as a nipper with the cited tools. The measured time for a working cycle, namely locking, severing, stringing and splicing may be maximally 30 or 20 seconds and at least 5 or 10 seconds. Therein splicing the web ends is done with high pressure to bring the thickness of a multi-ply splicing zone as near as possible to the initial web thickness by compacting or fused mass.

BRIEF DESCRIPTION OF THE DRAWINGS

Example embodiments of the invention are explained in more detail in the following and illustrated in the drawings in which.

DETAILED DESCRIPTION

Figure 1:
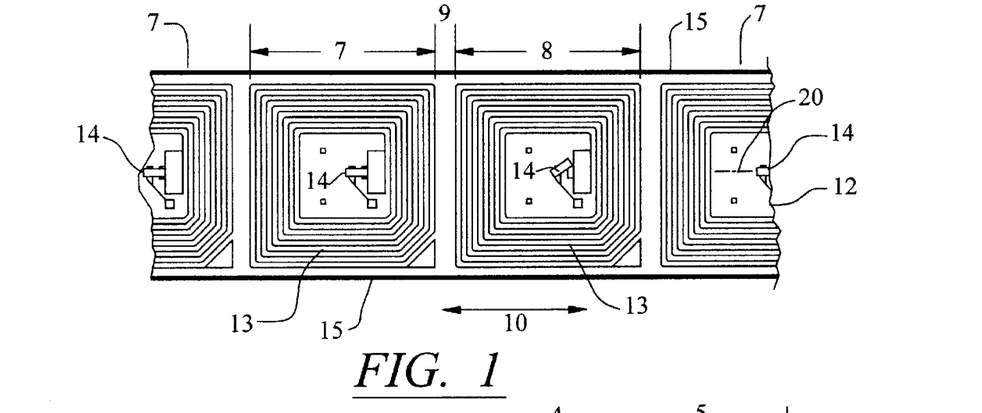
FIG. 1 is a top view of a length section of a web to be processed, namely a strip of transponders.
Figure 2:
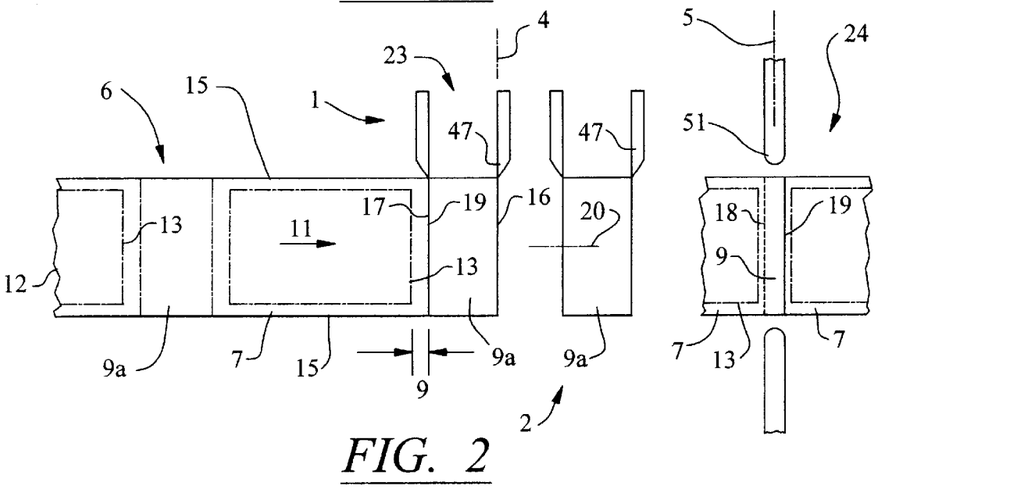
FIG. 2 is a side view showing the sequence of working steps according to the invention.
Figure 3:
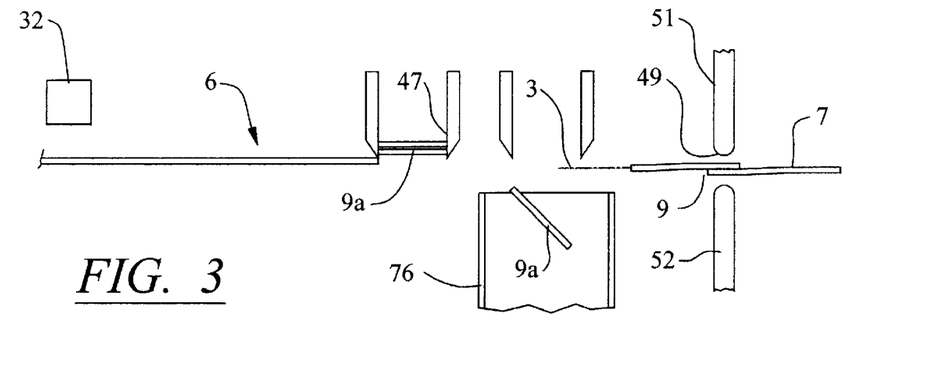
FIG. 3 shows the sequence of FIG. 2 but in cross-section through the web.

The apparatus 1 comprises a removal station 2 which defines a full-length horizontal or vertical web/working plane 3. Perpendicular to plane 3, the station 2 forms a removal plane 4 and directly adjacent thereto a jointing plane 5, both perpendicular to the length direction of the web 6 to be processed. Web 6 is, as FIGS. 1 to 3 show, a strip 6 comprising web fields which exclusively interconnect in a length extension 10. These fields are web fields or web sections 7, 8, preferably of the same size in the extension direction 10. Short, intermediate sections 9 join the sections 7, 8. Each section 7, 8 represents a transponder unit, except that the first sections 7 are non-defective and the second sections 8 are defective. Accordingly, the second sections are to be eliminated from web 6 by apparatus 1. By this elimination, a continuous use web is formed which has only first sections 7. Web 6 is moved parallel to plane 3 in direction 10 but only in one direction 11. This motion is continuous during detecting second sections 8 and incremental for the processing actions in planes 4, 5.

Web 6 has a base web or support layer which extends over the full length of web 6 and is maximally 160 mm and minimally 48 mm wide. In direction 10, each section 7, 8 covers the same extension as a layer 13 (or antenna) applied to one or both large faces of layer 12. Section 8 covers a panel position. Intermediate section 9 covers in direction 10 the spacing between adjacent layers 13. All sections 7, 8 have the same extension in direction 10 and all sections 9 have a smaller, but likewise equal extension. Layer 13 forms in a ring zone a rectangular spiral-shaped antenna layer and in the non-coated center of the ring two juxtaposed terminals for connecting to the counter contacts of a chip 14. Chip 14 is supplied with electric current from layer 13 and is written on with digitized information which chip 14 is able to transmit to a receiver contact-free or wireless. In componenting with the chips 14 defects of the cited functions occur in the individual units 8. Sections 8 are eliminated as refuse. Layers 13 extend practically up to the full-length parallel side edges 15 of web 6. Edges 15 are formed by layer 12. Layers 13 are equispaced from edges 15. This spacing is smaller than the width of section 9 in direction 10.

For sorting, a first severing cut is implemented in plane 4 and just downstream of the middle of section 9 which directly leads section 8. Layer 12 thus forms two web ends 16, 18 opposing each other in the same plane 3 as evident from FIG. 2. The downstream web end 18 is then displaced in direction 11 up to its splicing position in plane 5 and there locked. Then, the upstream end 16 is displaced transverse to plane while staying parallel to plane 3. Then end 16 is displaced in direction 11 until section 9 which trailingly connects to section 8 is located just ahead of its middle in plane 4. Thereby and during motion in direction 1 the section 8 is deflected transverse to plane 3. Thus defect or section 8 is removed from its panel position and from plane 3. When two or more sections 8 follow in sequence a corresponding multiple of this feed in direction 11 is implemented. Each of the cited displacements or motions is motor-driven. End 16 is then locked relative to plane 4 and the cut is implemented in the middle of trailing section 9. Thus section 8 is totally separated from web 6. Directly after separation, this section is then conveyed away from plane 3, (e.g. sucked off).

Web end 16 is then lifted contact-free in the vicinity of plane 4 by blower air or the like and fed by motor power in this condition in direction 11 until end 16 covers in plane 5 the end 18, which is still fixed. This covering extends over a width of 1 mm to 2 mm which is smaller than the width of section 9. Then end 16 is also locked relative to plane 5. The two overlapping ends are secured without any additive to each other thermoplastically by applying heat and pressure, namely by welding. The heating period for the weld is roughly 2 to 3 seconds and the rest period during which the weld cools and hardens while maintaining the press power transverse to plane 3 is 8 to 10 seconds and may be shortened by forced cooling, e.g. with blower air. This thermocompression reduces the thickness of the twin-layer splice, e.g. to the thickness of the adjoining sections of layer 12 or the overall thickness of layers 12, 13. On timeout of the rest period the press power is released. Then, also in the vicinity of plane 5 the web 6 is transposed into a non-contact condition on an air-cushion or the like. Then web 6 and the produced splice are transported on both sides of and between planes 4, 5 in direction 11 at a speed which is substantially higher than that which transfers into the second parting cut and splicing position.

As soon as the section field 8 has attained the region of station 2 the same working cycle is repeated for rejection, namely until the use web 6 is composed over its full length only of fields 7. For contact-free detection of section 8, a sensor 32 is provided upstream of and directly juxtaposed with plane 4, e.g. a scanner or reading head for chip 14. Sensor 32 detects section 8 while being conveyed at the higher speed in direction 11. Sensor 32 passes the detected data on to a control device whereafter the latter fully automatically controls the cited working cycle, namely each of the cited transport and processing steps, via suitable drives.

When, according to FIGS. 2 and 3, the spacings between juxtaposed layers 13 or the widths of sections 9, 9a, are relatively large, then in the severing station 23, two parallel parting cuts may also be implemented in a single working motion to separate a strip 9a in one go which is spaced from and located between these layers 13 and to reject strip 9a transverse to plane 3. Separating strip 9a along two separate cutting lines according to FIG. 2 is done in one single uninterrupted motion cycle which does not necessarily include that both knives 47 (or double tool) cut simultaneously. One knife could be set back relative to the other and, therefore, during the above named motion cycle one knife would cut prior to the other.

Then, instead of between the web ends 16, 18 as described above, the splice now is likewise produced between the resulting web ends 19, 18 as described above so that the splice is spaced from the two juxtaposed layers 13. Following the double parting cut which forms the transverse edges 16, 17 on section 9a and with web end stationarily locked this section 9a may be moved firstly in plane 3 in direction 11 and then exited transverse to plane 3 between planes 4, 5 e.g. into a shaft 76 through which vacuum air flows. Same applies also to sections 8 to be rejected which are separated in the same way as described by two double cuts. Then in each case, two sections 9a and separated therefrom the interposed section or sections 8 are conveyed in sequence transverse to plane 3. In any case, all spacings between adjacent sections 7 are reduced over the full length of web 6 in it being shortened. This is expedient for later further processing of web 6 or for later singling out sections 7. The sections to be rejected may also be exited transverse to plane 3 by compressed air or a corresponding conveying force.

Figure 4:
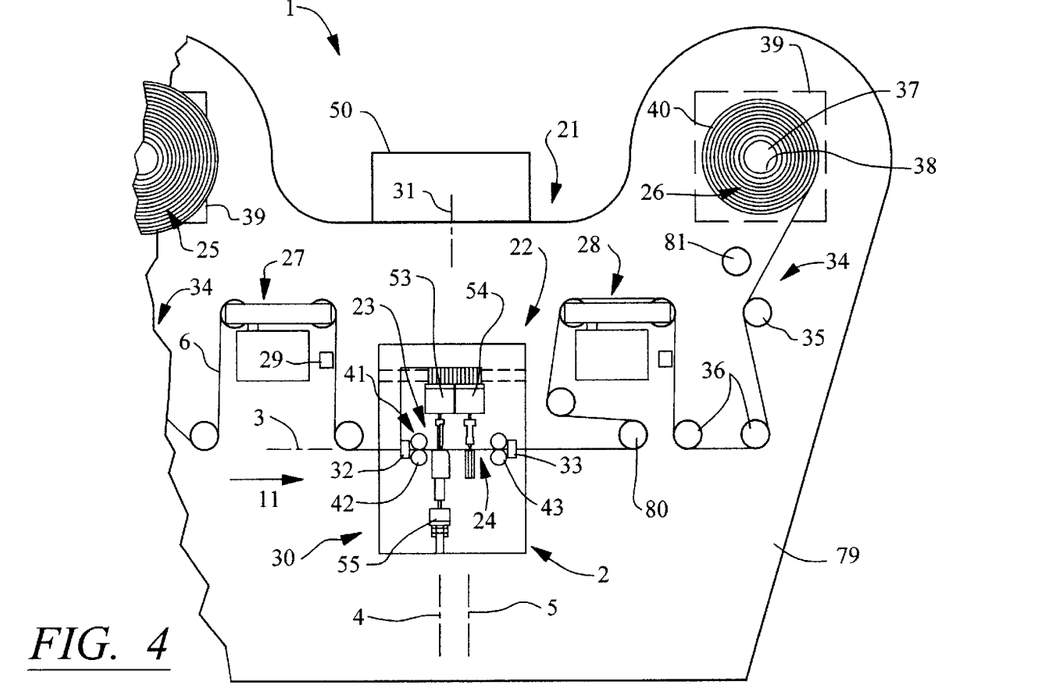
FIG. 4 is a detail of an apparatus according to the invention with horizontal deflections.

Upstream, between and downstream of planes 4, 5 all web parts, be they directly interjoined or parted for subsequent splicing, are held or transported in the same center plane 20 of web 6. Plane 20 is perpendicular to web 6. FIG. 4 makes evident that apparatus 1 has a stationary apparatus base 21 with removing means 22 which include stations 2 (or presses) or 23, 24. On both sides of these stations web stores 25, 26 are located. From store 25 the single-ply web 6 is pulled off. Thereby upstream of means 22 the web is transferred via multiple and counter directed transverse deflections into plane 3 of means 22. As long as web 6 is unparted or rejoined after parting it remains tensioned in this plane 3 up to downstream of means 22. There the use web is taken up by store 26 after multiple transverse deflection. The use web is drawn taut into store 26. Web 6 continues to be tautly tensioned during processing from each store up to plane 3 or up to directly adjacent the remote sides of planes 4, 5.

Aligning means 27, 28 directly adjoin upstream and downstream means 22 or the web run within plane 3. Aligners 27, 28 laterally align web 6 relative to plane 20 of apparatus 1. For this web edge control each aligner has on a frame two sequential deflectors for deflecting web 6 in each case through a max 100° or 90° arc angle. Between the deflectors the web runs parallel to plane 3 but between the latter and the associated store 25, 26. The deflectors are mounted on a frame which freely protrudes from a rotary mount in running direction 11. For the cited alignment and by pivotal motions the downstream deflector thus implements directing motions commonly with web 6. These motions are oriented transverse to direction 10 and parallel to plane 3. Downstream of each aligner 27, 28 a sensor 29 is provided to detect side alignment of web 6. Sensor 29 controls a corresponding motor drive for the transverse motion of the aligner.

Means 22 are combined into a preassembled removal unit 30 which is fixed to and non-destructively removable from base 21. Unit 30 is located roughly in the center plane 31 of base 21. Plane 31 is located between stores 25, 26 and perpendicular to plane 3 or to direction 11. Base 21 is mirror-symmetrical to plane 31. A sensor 33 has the functions as already described by way of sensor 32. Sensor 33 is located downstream of plane 5 and provided on unit 30 like sensor 32.

A buffer store 34 for web 6 is provided between each store and the associated aligner 27, 28 or station 2 which is formed by unit 30. Store 34 has a deflector 35 (or dancer roller and store member) which resiliently supports against the web from which the web runs contact-free or linearly up to the associated store 25 or 26. Each store 25 or 26 may receive web 6 folded zig-zag or as a roll 40. Deflectors 35 of both stores 34 are located level with aligners 27, 28 and are spring-loaded in the same direction transverse to plane 31 for pivoting the axis of the associated roll 40. On unrolling store 25 rotates in a direction which is opposite to that of the store 26 on roll up. Thus both rolls 40 have the same coiling direction. From each deflector 35 the web 6 which extends towards station 2 is guided over at least one further deflector 36. Each aligner 27 or 28 is located between two deflectors 26.

Each store 25 or 26 has a shaft 37 (or spindle) which extends perpendicular to the plane 20 and freely protrudes from base 21. Thus a sleeve 38 can be axially mounted on shaft 37 and non-rotationally connected thereto. Shaft 37 is radially expanded for bracing sleeve 38. Sleeve 38 serves as winding core on which the associated web roll 40 is positionally fixed. For control of delivery or reception of web 6 each store 25, 26 has a control unit 39 which electromotorically brakes the web motion or associated rotation of shaft 37 of store 25 and which electromotorically drives shaft 37 of store 26. Thus a transporting device is formed and transports web 6 with a predetermined or variable tension along a transport path or guide means from one store to the other. Unit 39 therefore represents drive means, break means and a first conveyor.

Additional to these transporting means which are separate from unit 30, the web conveyor also on unit 30 has a transporter 41 which contacts web 6 only in plane 3. Transporter 41 has an anteconveyor 42 which is directly juxtaposed with and located between plane 4 and sensor 32. A postconveyor 4 is correspondingly directly juxtaposed with and located downstream of plane 5 or upstream of sensor 33. These second conveyors 42, 43 or other appropriate members also form drive means and holding or clamping means for fixing web 6, especially while it is being processed in planes 4, 5. Therefor each conveyor 42 or 43 has two rollers 44, 45 which are located on both sides of plane 3 and bound the transport and clamping gap. The rollers of each transporter are located in a common axial plane parallel to plane 4, 5. One roller, such as the lower roller 44, is a rotary drive element driven by a motor 46 independently from the other second conveyor. The other roller 45 is an idler.

The tool unit for web severing in plane 4 comprises removing tools, namely a knife 47 which is interchangeably fixed to a knife mount and an opposing counter tool 48 or knives) which is located on the other side of plane 3, namely on the underside. Counter tool 48 is an anvil of a ceramic material for executing a squeeze cut The tool unit for splicing in plane 5 forms a press gap 49 which on the knives side is bounded by a ram 51 and which on the other side is bounded by a stationary counter tool 52 (or a counter tool and punch, a carrying tool, or a counter ram). Each of tools 47, 48, 51 can be reciprocated perpendicular to plane 3 independently of the others by a separate drive 53, 54 and 55 respectively, such as a fluid actuator, for implementing the cutting or pressing motions. For this purpose each associated tool holder is secured to the piston rod. The cylinder housing of the drive is fixed relative to base 21 or to lateral subcheeks 56, 56*a* of unit 3.

Figures 6, 7:
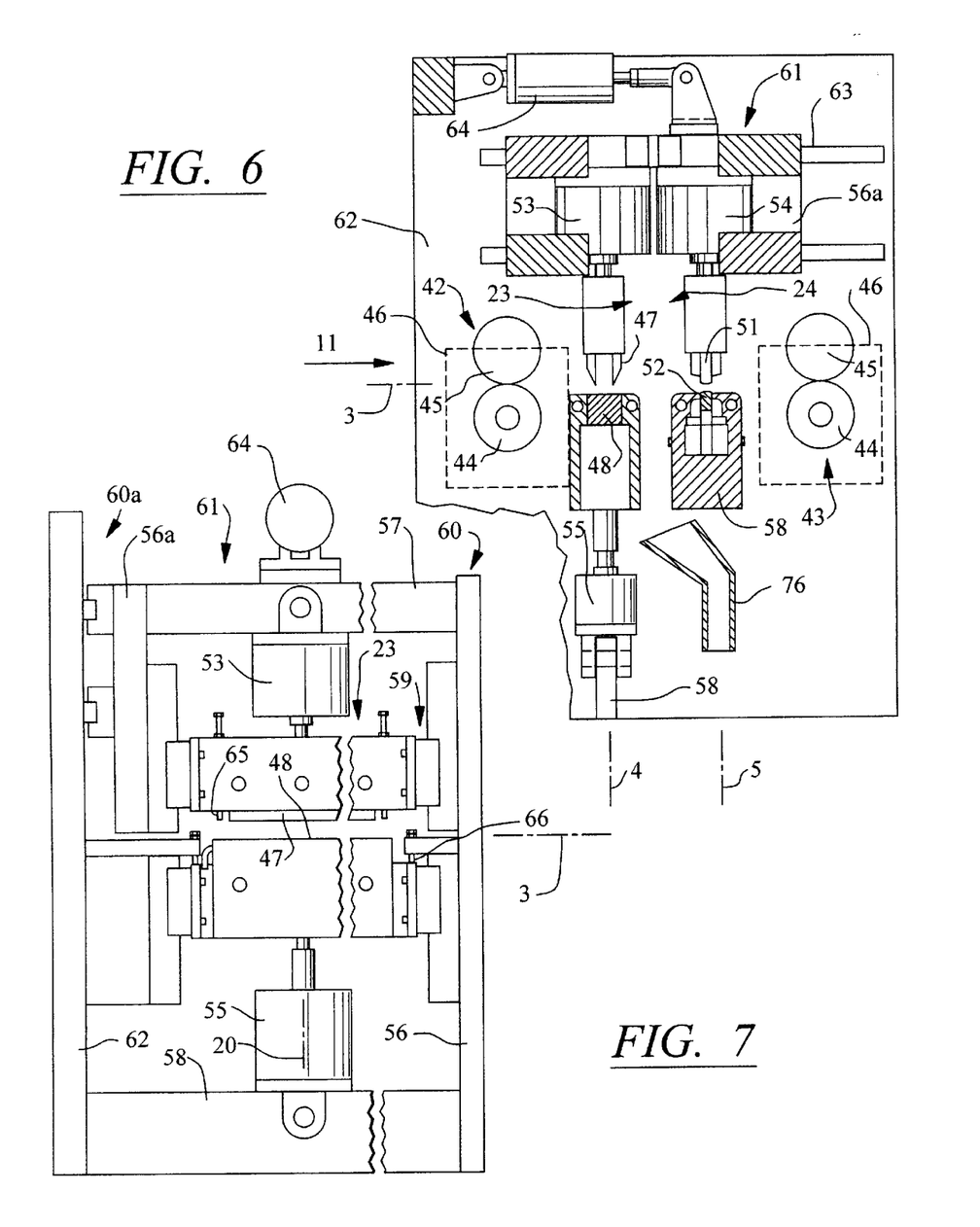
FIG. 6 shows an enlarged cross-section parallel to the drawing plane in FIG. 4 or 5 of the removal or working station.
FIG. 7 shows the severing station of the unit of FIG. 6 viewed in the running direction, whereby different configurations are shown on the left and right.
Figure 8:
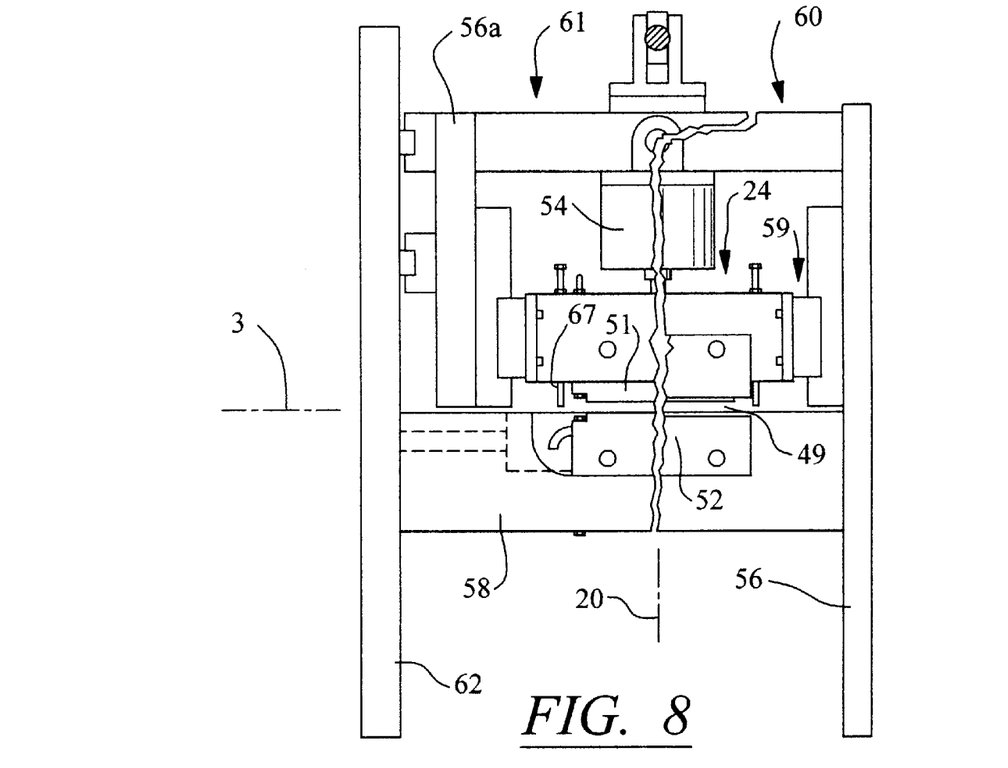
FIG. 8 shows the jointing station of the unit shown in FIG. 6 in a view corresponding to that in FIG. 7.
Figure 9:
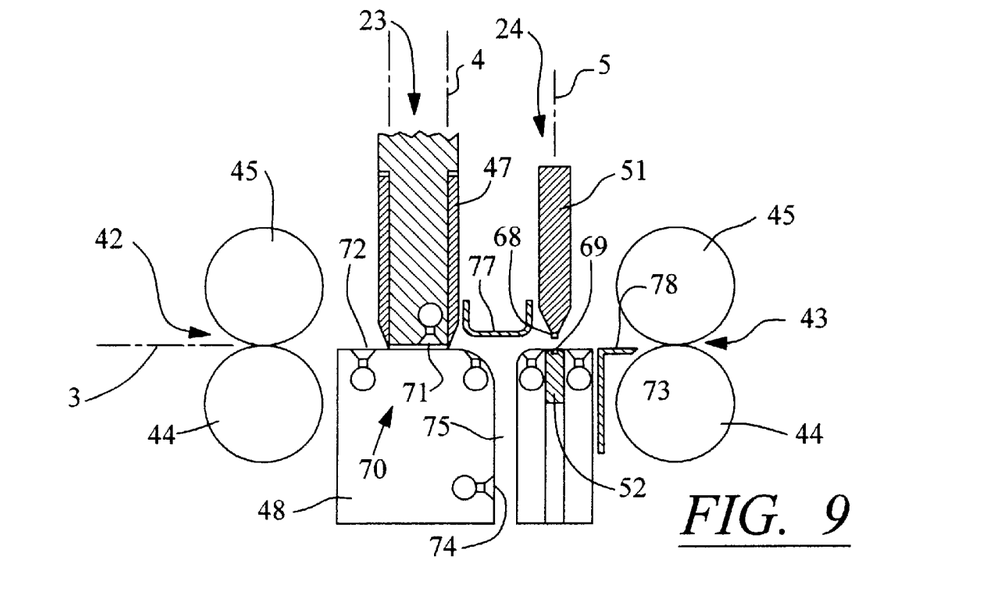
FIG. 9 is an enlarged detail of FIG. 6.

FIG. 6 illustrates the configuration shown left in FIGS. 7 and 8, whereby the configuration shown on the right is a simplified embodiment without the rejection motion of knife 47 as described by way of FIG. 2. Each of these embodiments is mirror-symmetrical to plane 20. In the right-hand embodiment of FIGS. 7 and 8 the side or second subcheeks 56 are located on both sides of tools 47, 48, 51, 52 and are the outermost parts of unit 30. In the vicinity of each station 23 or 24 the upper ends of cheeks 56 are interconnected via a cross-tie 57 (or bar, beam, and spar). Beneath each cross-tie 57 the cheeks 56 are each rigidly interconnected via a further cross-tie 57 which in station 23 is located at the lower cheek ends whereas in station 24 it is spaced above these ends. For the tools 47, 48 linear and mutually opposing guides 59 are provided on checks 56. Tools 47, 48 are displaceable on guides 59 perpendicular to plane 3. Drives 53, 55 are located at the mutually remote tool sides. The housing of drive 53 is fixed to cross-tie 57 and that of drive 55 on spar 58. A guide 59 is also provided for tool 51. Counter tool 52 is rigidly fixed to the associated spar 58. Parts 56 to 58 form a rigid frame 60 which is braced with the outside of one cheek against the front side of base 21. Thus frame 60 freely protrudes from this front side and the other cheek 56 is freely exposed.

In the left-hand embodiment of FIGS. 7 and 8 parts 56, 57 form a rigid frame or unit 61 which has only guide 59 for knife 47. Unit 61 and knife 47 are commonly movable relative to base 21 in and counter direction 11. Therefore a further or first subcheek 62 (or carriage) is located on the mutually remote outsides of each of cheeks 56*a*. Carriage 61 is mounted linearly reciprocatingly displaceable on the insides of cheeks 62. Cheeks 56*a* are interconnected only by cross-ties 57. Carriage 61 carries either only knife 47 with drive 53 or, as shown in FIG. 8, also tool 51 with drive 54 and the associated guides 59. Thus either only the single respective knife 47 or also tool 51 participates the motion in and counter direction 11. Beam 58 carrying drive 55 and beam 58 counter tool 52 are directly rigidly connected with cheeks 62 which also directly support guide 59 for counter tool 48. Carriage 61 is slidingly movable on guide 63 by a drive 64, for example a fluid cylinder/piston unit. One end of this drive is pivotably mounted on a tie-rod which rigidly interconnects cheeks 62 above cheeks 62. The other unit end is pivotably connected to the upper end of carriage 61 or to cross-tie 57.

Adjustable stops 65 variably limit the working motion of the knife 47. Stops 65 are lockable screws which are juxtaposed to both sides of knife 47 or of the tool ends. The associated counterstop is a planar continuation of the, anvil face of tool 49. Thus the cutting edges of knives 47 run linearly just up to abutment on this anvil face without being damaged. Corresponding stops 66 are also provided for the stroke end position of counter tool 48. This position is nearest to plane 3 or therein. Stops 66 are located on both sides of the ends of counter tool 48. Stops 65, 66 are adjustably mounted, namely stops 65 in the support of knife 47 and stops 66 on mounts which are fixed to the insides of cheeks 56, 62. Again corresponding adjustable stops 67 are provided on both sides of and adjacent to the ends of tool 51. Stops 67 are mounted on the associated tool holder. The counter face for stops 67 is a planar continuation of the press face of counter tool 52. Thus the minimal width of gap 49 and the thickness of the splice between web ends 16, 18 or 19, 18 is variably determinable. All stops are infinitely adjustable and lockable in each position. Like knives 47 also punches 51, counter tool 52 are exchangeably fixed to the associated tool holder. Each of tools 51, 52 contains a heating member 68 or 69 such as an electric resistance heater which forms the associated press face. The heating members are wired (not shown) to a control member of control means 50. The wiring leads for heater 68 of the movable punch 51 are flexible. Each press face is provided with an sticking coating or a film e.g. of tetrafluoroethy-lene.

Holding means with a fluid control 70 are provided for fixing individual web portions or sections on the supports of tools 47, 48, 52. Upstream of knife 47 or of plane 4 or between the cutting planes of the double knife 47 the associated tool support has a row of orifices 71 (or ports) in a holding face which faces counter tool 48. Orifice 71 are distributed over the tools working width. The holding face of the holder is set back relative to the cutting edges of knives 47 by only slightly more than the thickness of web 6. In the counter face of counter tool 48, namely both upstream and downstream of the knife or double knife 47 corresponding rows of ports 72 are provided. The downstream row ports into a rounding of the downstream end edge of this counter face. The rounding adjoins a tool face which is perpendicular to plane 3. In the vicinity of this face a further row of ports 74 is provided. Also upstream and downstream directly adjacent to the pressure face of tool 53 in each case a row of ports 73 is provided in the holder for counter tool 52. This holder is exchangeably fixed to support 58. Ports 73 traverse that face of the holder which is located in plane 3. The ports of each row are connected to a common length duct independent from the other rows. In turn this duct is connected via a flexible and/or rigid hose or tube and via suitable valves, such as solenoid valves, to a vacuum/compressed air source. These valves, like all drives, are controlled independently of each other by means 50.

A gap 75 providing a shaft is formed between tools 48, 52, 58. Gap 75 adjoins the upper opening of a shaft 76. With an upward alignment part 74 may also suck downwardly out of one or both shafts 75, 76. A guide face 77 is provided between tools 47, 51 to prevent, on exit of blower air from ports 72,73 or due to other effects, that parts of web 6 are moved upwards between these tools. A table face 28 is provided between counter tool 52 or holder 58 and the clamping transport gap of conveyor 43 to slidingly support web 6.

At its front side the base 21 is formed by a planar base or main cheek 79, beyond which units 25 to 28, 30 and the deflector freely protrude. Thus web 6 is moved directly adjacent to but continuously spaced from this front side. Also a sensing member 80 (or roller and deflector) such as a deflector or roller protrudes beyond the front side. Sensing member 80 deflects web 6 and continuously detects the web tension which is signaled to means 50 via a signal lead. Means 50 continuously maintain the web tension constant at one or both sides of station 2. The web section leaving store 25 or entering store 26 is relieved of static or electrical charges by a member 81 which likewise freely protrudes beyond the front side of base 21. This discharge rod 81 is permanently spaced from web 6 and thus without web contact. This spacing, which may be very small, may be maintained constant to adapt to the diameter changes of roll 40. Therefore member 81 is transversely movable, e.g. arranged on the mount of deflector 35 and thus shares the mounts motion transverse to plane 31.

FIG. 4 illustrates station 23 with only a single knife. This equipment is achievable in the other embodiments by eliminating the upstream knife. For machining, a web roll 40 is axially mounted on shaft 37 of store 25 from the front side of apparatus 1 and braced relative to shaft 37. The leading end of web 6 is then pulled off. The web end is then brought into engagement with aligner 27 by being moved transverse to its longitudinal direction and parallel to the web plane. Same applies for web engagement with deflectors 36 located on both sides of aligner 27 and with the associated buffer store 34. Thereafter the web end is sequentially threaded in direction 11 into sensor 32, conveyor 42, the cutting and clamping gaps of stations 23, 24 conveyor 43 and sensor 33. The web end now emerging downstream of unit 30 can then be again transversely engaged with sensing member 80, aligner 28, with deflectors 36 which are located on both sides of aligner 28 and with store 34. Sleeve 38 of cardboard or the like is then mounted on shaft 37 of store 26 and braced. The web end is then fixed e.g. by wrap clamping to the circumference of sleeve 38.

Apparatus 1 can now be put into operation by actuating a switch. Apparatus 1 operationally unrolls web 6 from store 25 continuously, laterally aligns web 6 relative to plane 20 of station 2 with device 27, distinguishes fields 8 from fields 7 by sensor 32 and stops upon detection of a field 8 in a way that the web region halts in plane 4, which is determined for producing edges 16, 18. This positioning is controlled by second conveyors 42, 43 which—should the cited web region 16, 18 have passed plane 4 in direction 11—are able to position the web also counter direction 11. After this positioning ports 72, 73 are exposed to suction air so that web 6 is sucked against the anvil faces of tools 48, 52, 58 and thereby fixed. Knife 47 then implements the cut in plane via drive 53. Thereafter conveyor 43 moves the downstream web end sufficiently in direction 11 to permit to permit that edge 18 can still be grasped by the upstream boundary of the press faces of station 24. Thereby sucking may still happen via ports 72, 73 to prevent web end 18 from lifting off while sliding over the anvil faces.

Drive 55 then moves the counter tool 48 inclusive the suckingly held web end 16 by a small travel downwards. Then the sucking air for ports 72 is turned off. Thereafter conveyor 42 pushes the upstream web end 16 over the cutting face of counter tool 48 against that face of tool 52, 58 which is oriented transverse to the cutting face and deflects end 16 on this transverse face away from plane 3 or downwards while arcuating end 16. This is continued until that section 9 which leads next section 7 has attained the cited cutting position in plane 4, i.e. when the section(s) 8 project downwards into gap 75 or shaft 76. Counter tool 48 is then again run upwards until abutting in the stop position or in plane 3. Thereafter conveyor 42 pushes and/or pull, as described before, web end 16 into the precise cutting position in plane 4. Then ports 72 are exposed to suction air whereby web end 16 is fixed to counter tool 48. Now the second step is implemented with knife 47 in the same way as described before so that section 8 or the electronic equipment is parted and sucked off or peeled off by port 74 and through shaft 76. Thereby the section air for downstream ports 72 which hold only section 8 may be turned off whilst remaining switched on for upstream ports 72.

Ports 72 are thereafter supplied with blowing air on both sides of plane 4 so that the upstream web end 16 with knife 47 lifted can be shifted by conveyor 42 contact-free on an air-cushion in direction 11 until the splicing position relative to downstream web end 18 is attained. Edge 16 or 19 can then be engaged by the downstream boundary of the press face of station 24. In this position the web ends are fixed by the clamping effect of conveyors 42, 43. Only now upstream ports 73 are supplied with section air so that upstream end 16 is fixed to the table face of tool 52, 58. Drive 54 then travels welding bar 51 against counter tool 52 to thus produce the welding connection. After the heating and holding period drive 54 travels tool 51 back into its open position.

Only now the suction air at ports 73 is switched off and instead blower air is connected to so that conveyors 42, 43 synchronously further transport web 6 in direction 11 as described above. During this transport ports 72, 73 thus are exposed to blower air so that web 6 is transported through the tool gap of stations 23, 24 contact-free until next section 8 to be rejected is processed. At the very end web 8 is rerolled from store 25 onto store 26 and no longer contains any sections 8 or defective electronic equipment. All of the cited motions are controlled fully automatically by control means 50. Roll 40 can then be removed from store 26 commonly with sleeve 38 and a further web 6 processed as described.

When using a double knife 47, namely for cutting out second sections 9a, air is sucked in through orifice 71 after implementing the cut to thus fix section 9a between counter tool 48 to the associated tool carried. After conveyor 43 has transferred downstream end 18 into station 24 as described, drive 64 runs knife 47 with cutout 9a in direction 11 above shaft 75, 76 and orifice 71 are changed over from section air to blower air. Thereby waste 9a is blown downwardly away from knife 47 and sucked off by port 74 into shaft 76. Drive 64 then returns double knife 47 to the cutting position in plane 4. Thereafter ports 72 are admitted to blower air and upstream end 19 is shifted into the splicing position in plane 5 as described. Thereafter the above described working steps for producing the splice are implemented.

If, in cutting out sections 9a, there is a need for a section 8 to be rejected a second double cut is implemented as described at the upstream end thereof before the splice is made.

Figure 5:
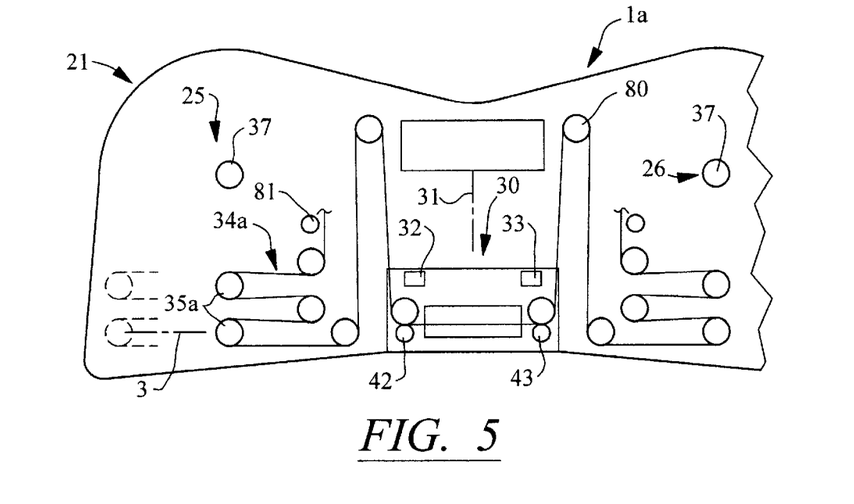
FIG. 5 is an embodiment of the apparatus with vertical deflectors.

In FIG. 4 the deflectors for web 6 are horizontal and base 21 forms a stand face at the bottom. In FIG. 5 the deflectors are vertical since base 21 is made for horizontal support by its rear face on a table face. Deflector 35a is radially linearly movable. Each store 34a has two such deflector 35a. In FIG. 4 web 6 is guided bilaterally beyond units 30, 42, 43 in plane 3. In FIG. 5 web 6 is unidirectionally deflected away from tools 48, 52 and over 900 by roller 45 of each conveyor 42, 43. Then web 6 is deflected back over 1800 on further guides and then deflected directly adjacent to the mutually remote sides of conveyors 42, 43 in counter directions onto the deflector 35a. The next sensing member 80 downstream of conveyor 43 forms the sensing member. Sensors 32, 33 are located between those web length sections which adjoin conveyors 42, 43 and are perpendicular to plane 3. Aligners are here not needed since web 6 is aligned by sliding on the planar front side of base 21a for a constant positioning of its center plane 20. Despite this, however, all features of each embodiment may be provided in any other embodiment.

All properties and effects may be provided precisely as described, or merely substantially or approximately so and may also greatly deviate therefrom depending on the particular requirements. The dimensions as illustrated may be expedient, particularly for a web 6 of 54 mm width and a maximum diameter of roll 40 of 600 mm.

What is claimed is:

1. An apparatus for processing a web into a continuous use web, wherein the web has web sections in a web plane, wherein the web sections include first sections and a second section which adjoins the first sections, wherein the second section defines an edge length parallel to a web length extension of the web and a panel position within the web, whereby the second section is removable from the panel position, thereby forming a continuous use web from the web, said apparatus comprising:

an apparatus base which is mobile;

a removal station on said apparatus base;

removing means in the vicinity of said removal station for removing the second section from the panel position and for altering the panel position to provide a substitute first section which interjoins the web and the continuous use web connecting to the web upstream of the substitute first section;

wherein said removal station has station ends which include a station inlet where the web enters and a station outlet where the continuous use web exits; and wherein at least one of said station ends includes a web conveyor which holds the first sections substantially parallel to the web plane and positively conveys the web, wherein said apparatus base commonly bears said removing means and said web conveyor.

2. The apparatus according to claim 1, wherein said removing means entirely removes the second section from the web plane to provide a web gap between the web and the continuous use web, said removing means subsequently mutually approaching the web and the continuous use web in a motion substantially parallel to the web plane to directly interjoin the first sections, whereby one of the first sections becomes the substitute first section.

3. The apparatus according to claim 1, further comprising a jointing station for fixedly interjoining the first sections by thermocompressive welding before the first sections arrive at said removal station, wherein the second section is located between the first sections, and said jointing station includes a thermocompressing welding unit on said apparatus base.

4. The apparatus according to claim 1, wherein said web conveyor is located at said station inlet, upstream of said removing means.

5. The apparatus according to claim 4, further comprising aligning means for laterally aligning the web, wherein said aligning means is located upstream of said web conveyor removing means.

6. The apparatus according to claim 1, wherein said web conveyor includes first and second conveyors at said station inlet located upstream of said removing means, and aligning means interposed between said first and second conveyors, wherein said aligning means laterally and variably aligns the web.

7. The apparatus according to claim 1, wherein said web conveyor is located at said station outlet located downstream of said removing means, said removing means defining a removing point where the second section is removed from the panel position, and wherein said removal station is free of any buffer store for variably storing the web between said removing point and said web conveyor.

8. The apparatus according to claim 1, further comprising aligning means for laterally and variably aligning the continuous use web downstream of said removing means, wherein said web conveyor is located upstream of said aligning means.

9. The apparatus according to claim 1, wherein said conveyor includes first and second conveyors at said station outlet located downstream of said removing means, and wherein said aligning means is interposed between said first and second conveyors, and said aligning means laterally and variably aligns the continuous use web.

10. The apparatus according to claim 1, further comprising guide means for guiding the web and the continuous use web through said removal station, wherein said guide means guides the first sections exclusively plane-parallel from said station inlet up to said station outlet, and wherein said guide means includes said web conveyor.

11. The apparatus according to claim 1, further comprising a removal plane where the second section is severed from the first sections and a jointing plane where the second sections are interjoined, wherein said removal plane is laterally displaced with respect to said jointing plane.

12. The apparatus according to claim 1, further comprising holding means for longitudinally holding the first sections close to said removing means while removing the second section, wherein said web conveyor includes said holding means, and wherein said web conveyor commonly conveys the web and the continuous use web parallel to the web plane.

13. The apparatus according to claim 12, wherein said holding means and said web conveyor commonly include a rotary drive element which directly supports the web sections, wherein said rotary drive element is motor driven, and fixes the web while removing the second section.

14. The apparatus according to claim 1, further comprising a web store for accumulating the web sections in superimposed layers directly contacting each other, wherein said apparatus base directly supports said web store.

15. The apparatus according to claim 14, wherein said web store is located at said station inlet and includes motion control means having break means for variably retarding the web while the web is longitudinally tensioned directly downstream of said break means, wherein said station inlet is located upstream of said removing means.

16. The apparatus according to claim 14, wherein said web store is located at said station outlet and includes motion control means having a motor drive means for collecting the continuous use web into said web store.

17. The apparatus according to claim 1, and further including a web store for accumulating the web sections in superimposed layers directly contacting each other, wherein a detector is included between said removing means and said web sore for distinguishing the first sections from the second section, said detector including at least one sensor located at least one of upstream of said removing means, and downstream of said removing means.

18. The apparatus according to claim 17, wherein the web is a transponder strip and each of the first and second sections is a transponder unit and includes electronic equipment, said sensor being a transmitter head for exchanging electronic data with the web sections, said removing means removing the electronic equipment from the panel position and reequipping the panel position with other electronic equipment.

19. The apparatus according to claim 1, further comprising a buffer store for variably storing the web sections while the web simultaneously enters and exits said buffer store, wherein said buffer store is located upstream of said removal means.

20. The apparatus according to claim 1, further comprising a buffer store for variably storing the first sections downstream of said removal means while the first sections enter and leave said buffer store, wherein aligning means is included for laterally and variably aligning the continuous use web, and wherein said aligning means is located upstream of said buffer store.

21. The apparatus according to claim 1, further comprising control means, wherein said control means include a test member which measures a tension of the web sections.

22. The apparatus according to claim 21, wherein said test member is located downstream of said removing means.

23. The apparatus according to claim 1, further comprising aligning means for laterally and variably aligning the web sections, and a deflector which deflects the web section; and wherein said web conveyor is located between said removing means and said deflector, the web sections extending substantially planarly from said deflector through said removing means.

24. The apparatus according to claim 1, further comprising a removal unit which includes said removing means, wherein said removal unit is a preassembled unit separable from said apparatus base.

25. The apparatus according to claim 1, further comprising a base cheek of said apparatus base, wherein said base cheek is stationary and includes a large cheek face angularly connecting to edge faces, said removing means freely projecting over and transverse to said large cheek face.

26. The apparatus according to claim 1, further comprising a subbase which includes a first subcheek and a second subcheek spacedly opposing said first subcheek, wherein only said first subcheek is directly fixed to said apparatus base; and wherein said removing means includes removing tools which are located between said first and second subcheek.

27. The apparatus according to claim 1, further comprising a center plane which is perpendicular to the web sections and to the web length extension within said removing means, wherein said center plane traverses the web downstream of said web conveyor and is substantially a plane of symmetry for at least one of said apparatus base, web stores storing the web and the continuous use web, buffer stores for variably storing the web and the continuous use web, aligning means for laterally variably aligning the web and the continuous use web, drive means of said web conveyor, and holding means for holding and mutually coplanarly approaching the web and the continuous use web while closing the panel position after removing the second section.

28. The apparatus according to claim 1, further comprising fluid control means for controlling a fluid directly contacting and positioning the web sections with respect to said apparatus base.

* * * * *